United States Patent [19]
Teagan

[11] 3,796,053
[45] Mar. 12, 1974

[54] LUBRICANT SEPARATION SYSTEM

[75] Inventor: William Peter Teagan, Billerica, Mass.

[73] Assignee: Thermo Electron Corporation, Waltham, Mass.

[22] Filed: Feb. 28, 1972

[21] Appl. No.: 229,886

[52] U.S. Cl.............................. 60/36, 60/64, 184/1 E
[51] Int. Cl.............................................. F01k 25/06
[58] Field of Search................................... 60/64, 36

[56] References Cited
UNITED STATES PATENTS

| | | | |
|---|---|---|---|
| 3,511,049 | 5/1970 | Norton et al. | 60/36 |
| 3,584,457 | 6/1971 | Davoud | 60/36 |
| 3,603,087 | 9/1971 | Burkland | 60/64 |

FOREIGN PATENTS OR APPLICATIONS

| | | | |
|---|---|---|---|
| 211,844 | 4/1925 | Great Britain | 60/64 |

*Primary Examiner*—Martin P. Schwadron
*Assistant Examiner*—Harold Burics
*Attorney, Agent, or Firm*—James L. Neal

[57] ABSTRACT

A vapor engine includes an expander, a lubricant storage zone, and a combination regenerative heat exchanger and lubricant separator. The combination device receives a mixture of lubricant and vaporized working fluid from the expander; the vaporized working fluid passes through the combination device to a condenser and the lubricant is separated from the working fluid and directed back to the lubricant storage zone. The lubricant storage zone is vented to a locus in the engine at a lower pressure than the pressure in the combination device to insure that the lubricant storage zone pressure will not exceed the pressure in the combination device.

15 Claims, 6 Drawing Figures

LUBRICANT SEPARATION SYSTEM

BACKGROUND OF THE INVENTION

In vapor cycle engines which use a bearing lubricant not absolutely sealed from the vapor side of the system, there tends to be at least some passage of lubricant around seals into the working fluid stream. This tendency is particularly evident in the expander. In closed systems, such passage of lubricant not only results in loss of the lubricant, but also in dilution of the working fluid stream. Consequently, closed vapor engine systems of this type require separators for separating lubricant from the working fluid stream and returning it to a lubricant storage area.

Accordingly, it is an object of this invention to provide a vapor engine system incorporating an uncomplicated and economical system for separating lubricant from the working fluid stream.

It is a further object of this invention to provide a vapor cycle engine including a low pressure oil separation system whereby economy and simplification are enhanced in the separation of lubricant from the working fluid stream.

It is another object of this invention to provide a lubricant separator in combination with another component in the vapor side of the vapor cycle engine.

SUMMARY OF THE INVENTION

This invention involves a system for separating lubricant from the working fluid stream in a vapor engine where the lubricant has a vapor pressure higher than the vapor pressure of the working fluid. In the vapor engine, working fluid vapor under pressure from a vapor generator is admitted to an expander and expanded to produce work. From the expander, the working fluid vapor may pass to a regenerative heat exchanger and then to a condenser. A feed pump directs condensed working fluid back through the regenerative heat exchanger to the vapor generator. The cycle is then repeated.

The engine component for effecting lubricant separation is to be located in the vapor side of the vapor cycle engine. That is, it is to be located in the working fluid stream downstream of the vapor generator outlet and upstream of the condenser inlet. Preferably, the lubricant separating component is located in the low pressure portion of the vapor side of the engine, downstream of the expander outlet, where a regenerative heat exchanger can be utilized as a combination regenerative heat exchanger and lubricant separator and thereby eliminate a separate component for effecting lubricant separation. In the low pressure portion of the combination regenerative heat exchanger and lubricant separator, the mixture of working fluid and lubricant from the expander separates due to a difference in states. The separated working fluid continues in the vapor cycle and the separated lubricant is fed to a lubricant storage zone maintained at a pressure level which establishes a pressure drop from the combination device to a lubricant storage zone. The lubricant storage zone may be maintained at a lower pressure than the pressure in the vapor portion of the combination device by venting the lubricant storage zone to a locus in the vapor engine which is at such lower pressure; for example, to the outlet of the condenser. Provision is made for utilizing a valveless metering means for admitting lubricant to the lubricant storage zone from the combination device.

DETAILED DESCRIPTION OF THE DRAWINGS

Figure 1:
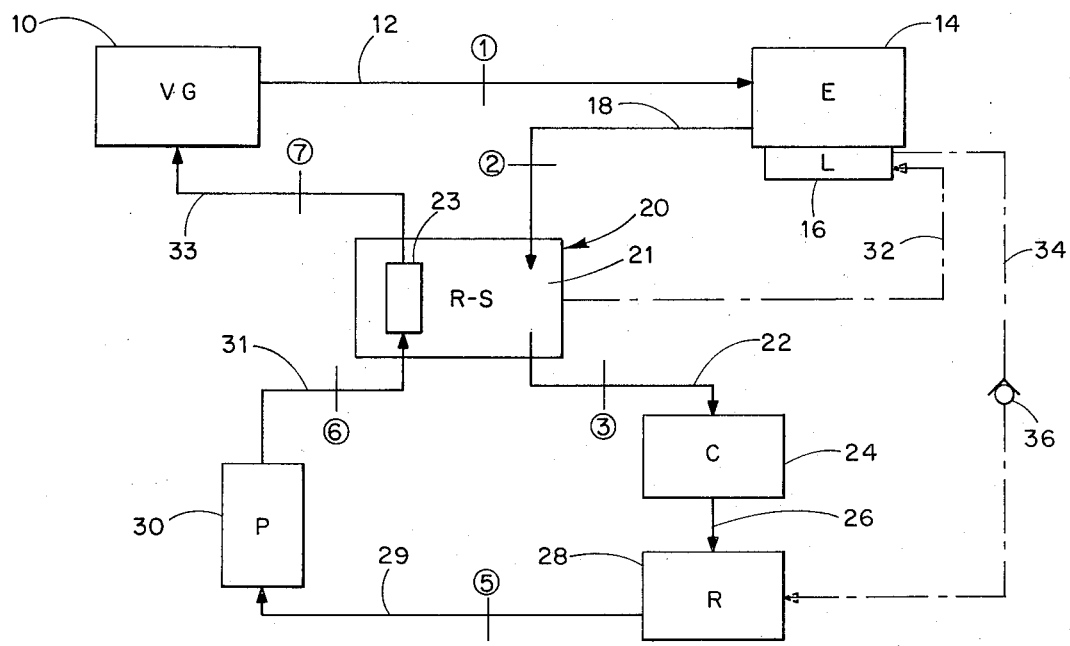
FIG. 1 is a schematic view illustrating a vapor engine having the lubricant separating system of this invention.
Figure 2:
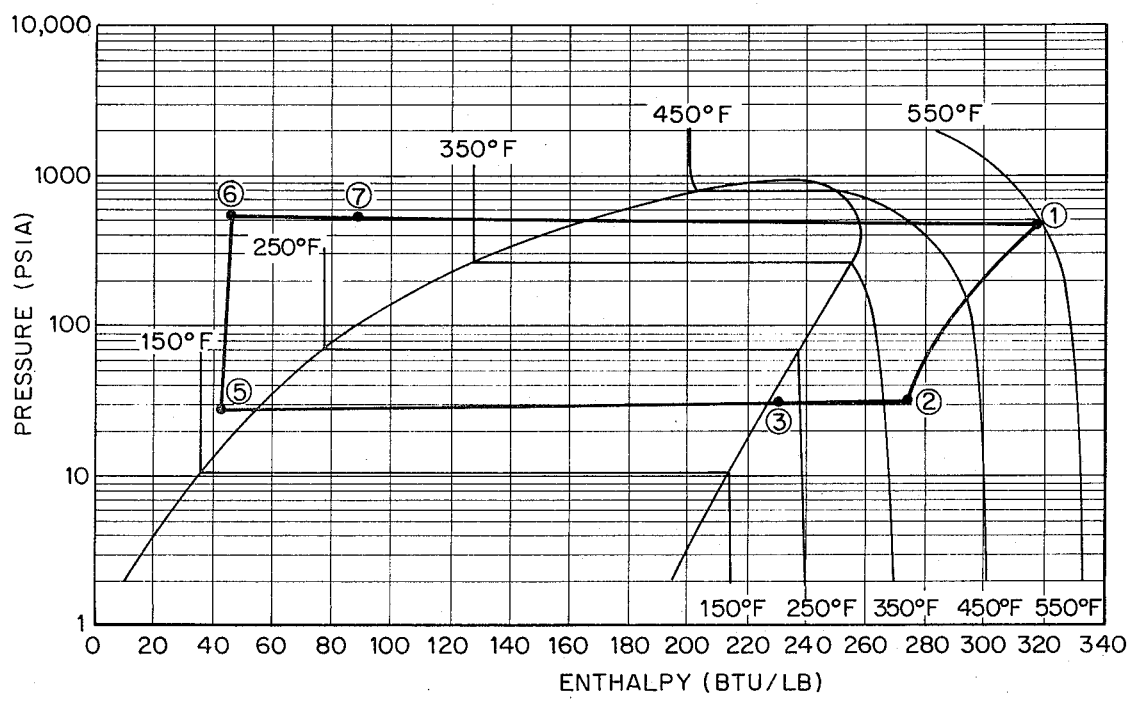
FIG. 2 is a typical pressure-enthalpy diagram for the engine of FIG. 1.

Reference is now made to FIG. 1 wherein there is shown a schematic view of a vapor cycle power generating engine and to FIG. 2 which illustrates a typical pressure-enthalpy diagram for the engine of FIG. 1. The circled numbers in FIG. 1 correspond to the numbered state points in FIG. 2.

The engine may be termed a Rankine cycle engine and is characterized by a "vapor side" and a "liquid side." The vapor side is that part of the cycle from the vapor generator 10 through the expander 14 and combination device 20 to the condenser 24. The liquid side exits from the condenser 24 through the reservoir 28, pump 30, combination device 20 and back to the vapor generator 10. It will be observed from the above that the combination device 20 is involved in both sides of the system and is therefore considered to have a "vapor side" and a "liquid side."

A vapor generator 10 vaporizes working fluid fed thereto by the pump 30 at a substantially constant pressure. This is represented on the pressure-enthalpy diagram of FIG. 2 between points 7 and 1. The vaporized working fluid is then fed through the passage 12 to the expander 14 which expands the vapor through a substantial temperature and pressure drop to produce shaft power, as represented in FIG. 2 between points 1 and 2. The working fluid then passes through the passage 18 to the combination regenerative heat exchanger and lubricant separator 20. The working fluid enters the vapor side 21 of the combination device 20 and gives up some of the heat energy remaining therein to the working fluid passing through the liquid side 23. This is illustrated thermodynamically between points 2 and 3 on the pressure-enthalpy diagram. From the vapor side of the combination device 20, the working fluid is admitted through the passage 22 to the condenser 24 wherein it is fully condensed as illustrated on the pressure-enthalpy diagram between points 3 and 5, the change of state designated by point 4 occurring within the condenser 24. From the condenser, the liquid working fluid is admitted through the passage 26 to the reservoir 28.

The pump 30 then drives the liquid working fluid from the reservoir 28 through the passages 29 and 31 and the liquid side 23 of the combination device 20 and back through the passage 33 to the vapor generator 10.

The working fluid is heated as it is driven through the liquid side 23 of the combination device 20 by exhaust vapor from the expander 14 flowing through the vapor side 21. Further heating and total vaporization takes place in the vapor generator. On the pressure-enthalpy diagram, the pumping step is represented between points 5 and 6, and regenerating step between points 6 and 7, and the vapor generating step between points 7 and 1. The system is operable under both wet vapor and superheat conditions, with the better performance being obtained under superheat conditions.

The expander 14 includes a lubricant storage zone 16 from which various parts of the expander are lubricated. For example, the lubricant storage zone may be the crankcase of a reciprocating piston expander or a chamber from which lubricant is fed to the bearings of a turbine expander. There is a tendency, during expander operation, for this lubricant to pass, in small amounts, into the working fluid stream. The prevention of such passage is controlled by seals, but many of the most effective and practical seals permit some lubricant to escape into the working fluid stream. The vapor cycle system of FIG. 1 is a closed system wherein fluid sealed within the system is cyclically vaporized, expanded, condensed, and revaporized. Accordingly, lubricant passing into the working fluid stream must be removed to avoid a buildup of lubricant in the steam which will cause deterioration of engine performance.

The combination device 20 serves as a regenerative heat exchanger to produce heat transfer between the vapor side and the liquid side of the engine. It also serves to remove lubricant from the working fluid stream.

In general, regenerative heat exchangers conduct liquid working fluid into heat exchange relationship with working fluid vapor and provide conduits or other fluid barriers for establishing separate flow paths for the working fluid in the vapor state and working fluid in the liquid state. The fluid conduits or other fluid barriers may be configured to provide a tortuous flow path for the fluid in the vapor side of the regenerative heat exchanger which will cause any lubricant droplets present in the working fluid vapor to coalesce. This may be further understood by reference to FIG. 2. It will be seen that the temperature in the vapor side of a typical regenerative heat exchanger may be between approximately 220°F and approximately 400°F at pressures near two atmospheres. Under these conditions, the working fluid is in the vapor state and the lubricant is in the liquid state. Thus, the lubricant may be separated from the working fluid in the vapor side of the regenerative heat exchanger by taking advantage of this difference in states.

Figure 5:
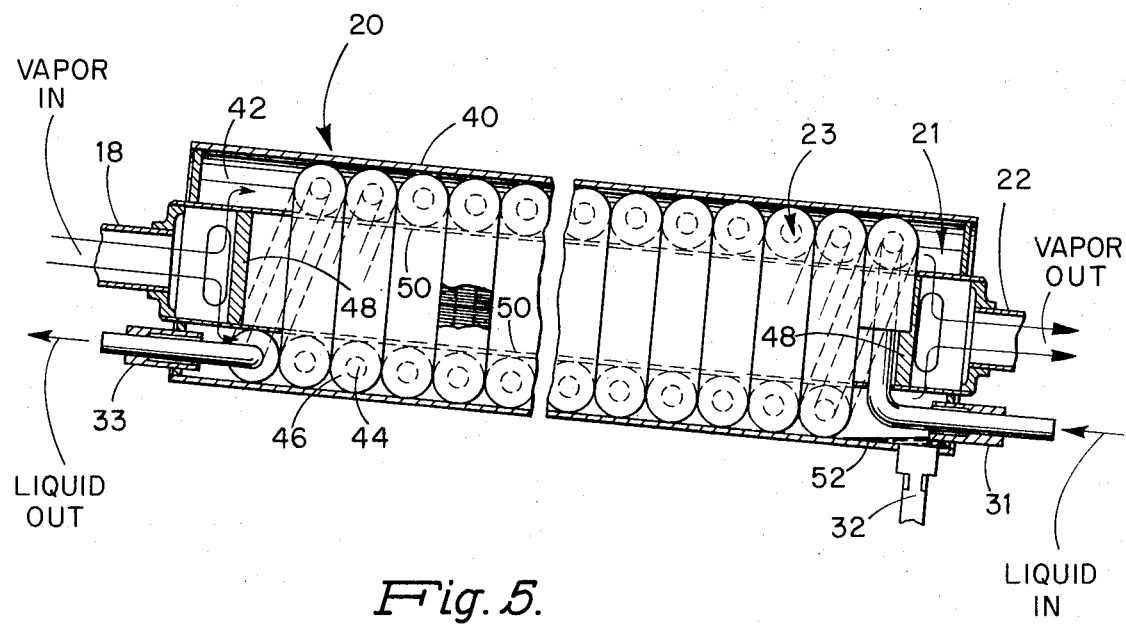
FIG. 5 shows one example of a combination regenerative heat exchanger and oil separator usable in connection with the lubricant separating system of FIG. 3.

One example of a combination device which serves as a regenerative heat exchanger and a lubricant separator is illustrated in FIG. 5. The tortuous path for fluid in the vapor side 21 thereof causes substantially all lubricant in the working fluid stream to be separated therefrom.

Figure 3:
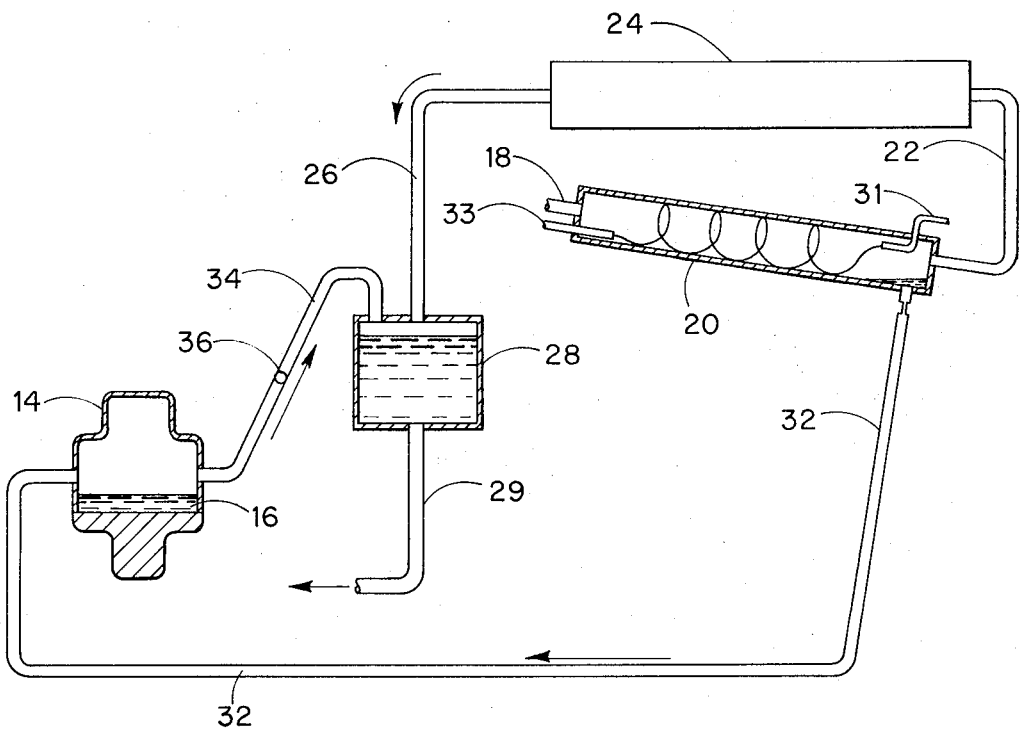
FIG. 3 illustrates a preferred embodiment of a lubricant separating system appropriate for use in connection with the vapor engine of FIG. 1.
Figure 4:
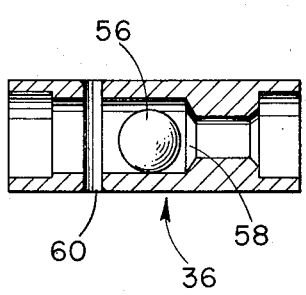
FIG. 4 is a detailed view of one element of the system of FIG. 3.

Separated lubricant is returned to a lubricant storage zone in a manner best understood by reference to FIGS. 1 and 3. Lubricant extracted from the working fluid in the combination device 20 is returned to the lubricant storage zone 16 for the expander 14. For this return to take place the pressure in the lubricant storage zone 16 must be not in excess of the pressure in the combination device 20. This may be achieved by venting the lubricant storage zone, through a line 34, to a locus in the system at a lower pressure than the pressure in the combination device 20, for example, to the outlet of the condenser 24 or into the reservoir 28. It can be seen by reference to FIG. 2 that there is a small pressure drop between state point 3 and state point 5. This is sufficient to cause lubricant flow.

Referring to FIGS. 3 and 5, vaporized working fluid from the expander enters the combination device 20 through the line 18 and exits therefrom through the passage 22. Working fluid vapor then passes to the condenser 24, reservoir 28 and pump 30 as described above. The pump then directs the condensed working fluid to the liquid side of the combination device 20. Liquid working fluid enters the combination device through the passage 31 and exits through the passage 33. In the liquid side of the combination regenerative heat exchanger and lubricant separator, the working fluid is confined within a relatively small volume, while in the vapor side of the combination device, the working fluid expands to fill substantially the entire remaining volume.

The combination device 20 may be of any suitable configuration, one example being shown in FIG. 5. This combination device 20 includes a housing 40 forming a passage 42 which essentially constitutes the vapor side 21 of the combination device. Within the housing 40 is coiled a tube 44 having fins 46 extending therefrom. The tube 44 essentially constitutes the liquid side of the combination device in that it serves to receive liquid working fluid from the pump 30 through the passage 31 and confine it in its travel through the combination device to the passage 33. The fins 46 promote heat exchange between the vaporized working fluid and the liquid working fluid and increase the tortuous character of the tortuous path in the vapor side of the combination device 20 to thereby promote lubricant separation. A system of baffles 48 and a cylindrical guide 50 are incorporated into the device so that all of the material in the vapor side combination device travels along a tortuous path formed by the fins 46 and the tube 44. The expansion of the material entering the housing 40 from the passage 18 results in a relatively slow travel of this material through the tortuous path established by the tube and its associated fins. This maximizes heat exchange and the lubricant separation is substantially complete.

The combination device 20 is provided with a sump 52. The sump may be formed at one end of the housing 40 by maintaining the combination device in an inclined position relative to the horizontal so that separated lubricant collects therein, when the engine in which it is being used permits of such an arrangement. Separated lubricant is returned to the lubricant storage zone 16 from the sump 52 through the metering means 32. The lubricant storage zone 16 is vented to the reservoir 28 by the line 34. The reservoir is ordinarily the point of lowest pressure in the system. The lubricant storage zone 16 is thereby maintained at this minimum pressure, at a pressure level lower than any pressure in the vapor side of the combination device. However, as a safety feature, the line 34 contains a check valve 36 to prevent passage of fluid to the lubricant storage zone 16 from the reservoir 28 in the event that the reservoir should experience a pressure which is higher than the pressure in the combination device 20. The check valve 36 is characterized by a substantially zero pressure drop and may consist of a light aluminum ball 56 held within a cage forming a valve seat 58 and a retainer 60.

In the system of FIG. 3, the metering means 32 provides a continuously open conduit leading from the vapor side of the combination device 20 to the lubricant storage zone 16. The conduit is continuously open and appropriate means is provided for accurately metering the amount of fluid which may pass therethrough. Metering may be accomplished in numerous ways, for example, by providing a fixed orifice at the lubricant outlet from the housing 40 or, when conditions permit, establishing a length and internal diameter of the tube which will provide the desired flow rate for the anticipated pressure drop. The metering function of the orifice 52 or the line 32, or a combination of the two, may be determined in the following manner. The configuration of the metering means is a function of the maximum rate of lubricant separation and the pressure difference between the vapor side of the combination device and the lubricant storage zone. Accordingly, the configuration of the metering means is that which will pass lubricant at a rate equal to the anticipated maximum rate of separation at the anticipated pressure difference. Since the lubricant does not pass into the working fluid stream at a constant volumetric rate and thus is not separated therefrom at a constant rate, when the rate of lubricant separation drops below the maximum for which the metering means was designed, working fluid is admitted to the storage zone through the metering means. Accordingly, for the highest anticipated pressure differential, the maximum amount of working fluid vapor which will pass through the lubricant storage zone may be determined under conditions of zero lubricant flow to assure that the amount of such working fluid passage is not excessive for the engine under consideration. The rate of working fluid flow is extremely low since, when it passes the metering means, it is in the vapor state and experiencing a small pressure drop. The very small amount of vaporized working fluid which enters the lubricant storage zone passes therethrough to the reservoir 28 through the vent line 34 and thus does not impair engine performance.

An engine system of the type illustrated in FIGS. 1 through 3 typically operates with an inlet pressure to the vapor generator of approximately 520 psia. The lubricant storage zone 16, the vapor side 21 of the regenerator 20, and the reservoir 28 all typically operate between 20 psia and 40 psia with the lubricant storage zone and the reservoir being at substantially the same pressure level and the vapor side of the generator being at a pressure level slightly higher than the pressure level in these two components. This pressure difference is illustrated in FIG. 2 between state point 3 and state point 5. Typical pressure differences between state points 3 and 5 range between 1 psia and 5 psia. It is usually desirable for the minimum (i.e., 1 psia) to be that for which the configuration of the metering means is determined. The metering means is calibrated to provide the maximum amount of resistance which will permit separated lubricant to flow at a rate equivalent to the maximum anticipated rate of separation. Thus, when the anticipated maximum amount of lubricant is being separated from the working fluid stream, no vaporized working fluid is permitted to pass through the lubricant separating system to the storage zone 16. On the other hand, under the same conditions, if no lubricant is present, working fluid may pass to the storage zone.

For a six horsepower system with a reciprocating piston expander which has been produced at Thermo Electron Corporation, the assignee of this patent qpplication, a typical lubricant separation rate is 1.0 pound per hour. For a pressure drop of 1.5 psia between the vapor side 21 of the combination device 20 and the reservoir 28, a conduit 12.5 inches long and having an internal diameter of 0.036 inches will transport 1.0 pound per hour of Suniso 3GS lubricant. This may be expected to pass about $4.66 \times 10^{-3}$ pounds per hour of working fluid if no lubricant is present. The flow rate of working fluid in the engine cycle averages approximately 500 pounds per hour under normal operating conditions. It can be appreciated that this small amount of working fluid passing through the metering means 32 and the storage zone 16 have no significant effect on vapor engine efficiency.

An essential requirement of this invention is that there be established a pressure drop from the lubricant separator to the lubricant storage zone. The foregoing discussion has assumed that the lubricant separator and the lubricant storage zone are at substantially the same elevation. However, elevational difference between them produces a pressure drop functionally related to the elevational difference. This must be considered in the relative placement of the lubricant storage zone and the lubricant separator and in the design of the metering means. For example, in the above described embodiment, if the combination device 20 is above the storage zone 16, the metering means must be calibrated to provide an increased flow resistance to compensate. On the other hand, if the combination device 20 is below the storage zone 16, the metering means must be calibrated to provide reduced flow resistance. Obviously, the lubricant storage zone can not be placed so far above the combination device that the pressure head created by the placement equals or exceeds the pressure drop occurring in the engine between the combination device 20 and the reservoir 28, as represented between state point 3 and state point 5 on the pressure-enthalpy diagram of FIG. 2. It has been found that elevational difference between the combination device 20 and the lubricant storage zone 16 produces approximately a 1 psia pressure drop per foot of difference.

Figure 6:
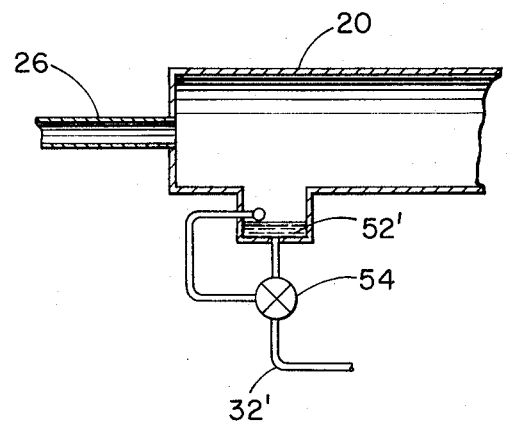
FIG. 6 is a broken-away view illustrating an alternate embodiment of the device shown in FIG. 5.

Other metering means than the type described above may be used. For example, FIG. 6 illustrates a combination device provided with a sump 52' for collection of separated lubricant. FIG. 6 also illustrates that the combination device 20 may be provided with a valved metering means instead of a continuously open one. Such a valved metering means may consist of a liquid level responsive valve 54 operating from the sump 52'.

It will be apparent from the above that any combination of working fluids and lubricants may be used as long as they are compatible with each other and other parts of the engine system and as long as the lubricant possesses thermodynamic properties which will avoid lubricant vaporization during lubricant separation. Examples of suitable working fluids are trifluoroethanol and water mixtures such as "Fluorinol 85" manufactured by Halocarbon Products Corporation, Hackensack, N. J., pure trifluoroethanol, thiophene, and pyridine. The pressure-enthalpy diagram of FIG. 2 is patterned generally after that associated with "Fluorinol 85." Examples of suitable lubricants are "Suniso 3GS" manufactured by the Sun Oil Company, "Humble Therm 500" or "Teresso 43" manufactured by Humble Oil Company, and "Krytox" manufactured by E. I. du Pont de Nemours and Company, Inc.

This invention has been described with reference to various preferred embodiments. It should be understood, however, that modifications may be made by those skilled in the art without departing from the scope of the invention.

I claim:

1. A closed vapor cycle engine comprising a vapor generator for vaporizing organic working fluid, an expander for expanding vaporized working fluid from said vapor generator to produce work, a lubricant storage zone, a condenser for condensing vapor discharged from said expander, a feed pump for returning condensed working fluid to said vapor generator, and a lubricant separating system, said lubricant separating system comprising:
   a. means downstream of the outlet of said vapor generator and upstream of the inlet of said condenser for separating lubricant from said working fluid;
   b. fluid metering means forming a continuously open return conduit from said separating means to said lubricant zone for conducting to said storage zone a measured amount of lubricant which has passed into the working fluid stream; and
   c. vent means connecting said lubricant storage zone to a locus in said system at a lower pressure than the pressure in said separator for establishing a pressure in said lubricant storage zone lower than the pressure in said separator.

2. A vapor cycle engine according to claim 1 further comprising a safety check valve means in said vent means for insuring against fluid flow from said relatively low pressure zone to said lubricant storage zone.

3. A vapor cycle engine according to claim 2 wherein said check valve means is characterized by a substantially zero pressure drop.

4. A closed vapor cycle engine utilizing an organic working fluid and a lubricant having a low vapor pressure relative to the vapor pressure of said working fluid comprising:
   a. a vapor generator for vaporizing working fluid;
   b. an expander for expanding vaporized working fluid to produce work;
   c. means forming a lubricant storage zone for said expander;
   d. means for condensing working fluid vapor discharged from said expander;
   e. feedpump means for driving condensed working fluid from said condensing means to said vapor generator;
   f. means forming a combination regenerative heat exchanger and lubricant separator receiving from said expander vaporized working fluid and any lubricant which has entered the working fluid stream for collecting therein lubricant in the liquid phase and conveying therethrough working fluid in the vapor phase;
   g. fluid metering means for returning lubricant collected in said combination device to said lubricant storage zone; and
   h. means for venting said lubricant storage zone to a locus in the vapor cycle engine at a lower pressure than the pressure in said combination device for establishing a pressure in said lubricant storage zone which is lower than the pressure in said combination device.

5. A vapor cycle engine according to claim 4 wherein said fluid metering means consists of a continuously open conduit calibrated to permit passage of a predetermined amount of lubricant at a predetermined pressure drop between said combination device and said lubricant storage zone.

6. A vapor cycle engine according to claim 4 wherein said venting means comprises a vent line extending from above the liquid level of said lubricant storage zone to a locus in said engine at a lower pressure than the pressure in said combination device.

7. A vapor cycle engine according claim 6 further comprising a working fluid reservoir for receiving condensed working fluid from said condensing means wherein said vent line extends from said lubricant storage zone to a locus between the outlet of said condensing means and the liquid level in said reservoir.

8. A vapor cycle engine according to claim 7 comprising check valve means in said vent line for preventing fluid flow to said lubricant storage zone from said locus between said outlet of said condenser and the liquid level in said reservoir.

9. A vapor cycle engine according to claim 8 wherein said check valve means is characterized by a substantially zero pressure drop.

10. In a vapor cycle engine having a vapor generator for vaporizing working fluid, an expander for expanding vaporized working fluid to produce work, a lubricant storage zone, a condenser for condensing vapor discharged from said expander, and a feedpump for returning condensed working fluid to said vapor generator wherein at least some lubricant from said engine passes into the working fluid stream, the method comprising the steps of:
   a. separating lubricant in the liquid state from said working fluid stream while said working fluid stream is in the vapor state;
   b. maintaining the pressure in said lubricant storage zone at a level below that at which said lubricant separating step occurs; and
   c. transporting such separated lubricant to said lubricant storage zone by means of the pressure differential resulting from said maintaining step.

11. In a closed vapor cycle engine having a vapor generator for vaporizing organic working fluid, an expander for expanding vaporized working fluid to produce work operatively associated with a lubricant storage zone, a condenser for condensing vapor discharged from said expander, a regenerative heat exchanger for producing heat exchange between working fluid vapor and condensed working fluid, and a feedpump for returning condensed working fluid to said vapor generator, wherein at least some lubricant from said expander passes into the working fluid stream, the method comprising the steps of:
   a. separating lubricant which has passed into the working fluid stream from said working fluid stream in said regenerative heat exchanger;
   b. maintaining said lubricant storage zone of said expander at a pressure below the pressure of said regenerative heat exchanger;
   c. transporting lubricant separated in said separating step from said regenerative heat exchanger through a passageway to said lubricant storage zone of said expander by means of the pressure differential resulting from said maintaining step; and d. limiting the maximum lubricant flow through said passageway as a function of said pressure differential.

12. A vapor cycle engine according to claim 1 wherein said lubricant separating means is located not substantially below said lubricant storage zone.

13. A vapor cycle engine according to claim 1 wherein said venting means comprising means for establishing a pressure drop of not less than 1 psia.

14. A vapor cycle engine according to claim 13 wherein said venting means comprises means for establishing a pressure drop not in excess of 5 psia.

15. A vapor cycle engine according to claim 14 wherein said lubricant storage zone is at an elevation less than one foot above said lubricant separating means.

* * * * *